United States Patent

Blankenburg

[11] Patent Number: 5,752,637
[45] Date of Patent: May 19, 1998

[54] VEHICLE ARTICLE CARRIER

[76] Inventor: Karl Blankenburg, 32131 Claeys Dr., Warren, Mich. 48093

[21] Appl. No.: 664,843

[22] Filed: Jun. 17, 1996

[51] Int. Cl.⁶ ...................................................... B60R 9/04
[52] U.S. Cl. ........................................ 224/321; 224/326
[58] Field of Search ................................ 224/321, 326, 224/309, 310, 554, 510, 281; 414/462; 296/223, 37.7, 97.4; 410/128, 124

[56] References Cited

U.S. PATENT DOCUMENTS

| | | |
|---|---|---|
| D. 314,541 | 2/1991 | Bott . |
| D. 319,810 | 9/1991 | Stapleton et al. . |
| 3,545,660 | 12/1970 | Stephen . |
| 3,554,416 | 1/1971 | Bott . |
| 3,806,186 | 4/1974 | Mauron .................. 296/223 |
| 4,294,388 | 10/1981 | Wünstel . |
| 4,684,048 | 8/1987 | Bott . |
| 4,877,168 | 10/1989 | Bott . |
| 4,903,876 | 2/1990 | Bott . |
| 4,911,348 | 3/1990 | Rasor et al. . |
| 4,953,757 | 9/1990 | Stevens et al. .......... 224/310 |
| 4,972,983 | 11/1990 | Bott . |
| 4,982,886 | 1/1991 | Cucheran . |
| 4,988,026 | 1/1991 | Rasor et al. . |
| 5,082,158 | 1/1992 | Bott . |
| 5,104,019 | 4/1992 | Bott . |
| 5,133,490 | 7/1992 | Cucheran . |
| 5,143,267 | 9/1992 | Cucheran et al. . |
| 5,190,198 | 3/1993 | Cucheran . |

FOREIGN PATENT DOCUMENTS

9410007  5/1994  WIPO ............................... 224/321

Primary Examiner—Linda J. Sholl
Attorney, Agent, or Firm—Young & Basile, PC

[57] ABSTRACT

A vehicle article carrier having at least one lateral cross rail selectively positionable along a pair of longitudinally extending side rails. A threaded rotatable shaft is mounted in each side rail. First and second shuttle cleats are connected to opposite ends of the cross rail. Each shuttle cleat is slidably mounted in one side rail and threadingly coupled to the rotatable shaft in each side rail. An output shaft of each of a pair of electric drive motors is coupled to the rotatable shaft in each side rail for linearly adjusting the position the movable cross rail along the side rails upon rotation of the rotatable shafts.

19 Claims, 6 Drawing Sheets

VEHICLE ARTICLE CARRIER

BACKGROUND OF THE INVENTION

1. Field of the Invention

The present invention relates to article carriers for vehicles.

2. Description of the Art

A variety of different article or cargo carriers have been devised to transport articles or cargo on the exterior surfaces of vehicles. such as on the roof or trunk of an automotive vehicle. Such carriers typically include a pair of side rails fixed to and extending longitudinally of the vehicle exterior panel. At least a pair of cross rails are connected to and extend laterally between the side rails for supporting a load on the article carrier and to provide convenient tie-down of the load or cargo. Such cross rails are typically supported above the vehicle exterior surface by stanchions mounted on opposite ends of each cross rail which slidably engage the side rails.

In order to facilitate the transport of different sized loads or cargo. slidable and even removable cross rails have been provided in vehicle article carriers. At least one and, frequently, all of the cross rails on a vehicle article carrier are provided with stanchions which slide within or on a side rail and include a releasable latch which engages the side rail in one of a number of discrete positions or at any variably selected position along the length of the side rail.

Such latch mechanisms are mounted in each stanchion and include rotatable knobs. cam levers. clamps and pivotal hooks which releasably engage a side rail.

In order to reposition a movable cross rail. after the latch has been released, a user will grasp the cross rail, typically adjacent one end or stanchion, and then forcibly urge the cross rail longitudinally along the vehicle roof to the desired position before reengaging the latch or latches. During such movement. it is difficult for a single person to move the cross rail squarely along the side rails when only exerting force on the cross rail from one side of the vehicle which impedes the smooth sliding movement of the cross rail.

Thus, it would be desirable to provide a vehicle article carrier with a movable cross rail which ensures that the movable cross rail remains perpendicular to the side rails during all longitudinal movement of the cross rail along the side rails. It would also be desirable to provide a vehicle article carrier with a movable cross rail in which the movable cross rail may be adjustably repositioned by a powered drive mechanism.

SUMMARY OF THE INVENTION

The present invention is a vehicle article carrier which provides adjustable positioning of a moveable cross rail along a pair of spaced side rails while maintaining the movable cross rail in substantial perpendicularity to the side rails.

In one embodiment. the vehicle article carrier includes a pair of spaced side rails mounted on and extending longitudinally along a vehicle body surface. A cross rail is slidably mounted on and extends between the side rails and is movably positionable along the side rails. A rotatable shaft is mounted in both side rails.

Means are coupled to each rotatable shaft for rotating each shaft. Means are coupled to the rotatable shaft and to the movable cross rail for longitudinally adjusting the position of the movable cross rail along the side rails while maintaining the movable cross rail substantially perpendicular to the side rails in response to rotation of the rotatable shafts.

In one embodiment, a shuttle cleat is slidably mounted within each side rail. Means are provided for coupling the rotatable shaft in each side rail to the shuttle cleat for longitudinal movement of the shuttle cleat upon rotation of the shaft. Means are also provided for connecting the shuttle cleat to one end of he moveable cross rail such that the cross rail moves longitudinally along the side rail with movement of the shuttle cleat.

The rotating means preferably comprises an electric motor having a bi-directional rotatable output shaft. In one embodiment, the electric motor is mounted in each end cap at one end of each of the side rails. The output shaft of each motor is coupled to one end of one rotatable shaft. Preferably, each motor output shaft is axially coupled to the end of one rotatable shaft. Preferably, a separate electric motor may be coupled to one end of each of the rotatable shafts.

In an alternate embodiment. flexible connectors or shafts are connected to the output shafts of a single drive motor mounted in a cross rail stationarily extending between the side rails. An opposite end of each connector is coupled to one of the rotatable shafts in each side rail to provide rotative power to the rotatable shafts for repositioning of the movable cross rail along the side rails.

The vehicle article carrier of the present invention provides adjustable repositioning of a movable cross rail along a pair of the side rails while maintaining the ends of the movable cross rail substantially perpendicular to the side rails for easy sliding movement of the movable cross rail. The use of a drive motor uniquely repositions the movable cross rail without user force on the cross rail and. further. provides an automatic locking of the cross rail in a selected position when the motor is deactivated.

BRIEF DESCRIPTION OF THE DRAWING

The various features. advantages and other uses of the present invention will become more apparent by referring to the following detailed description and drawing in which.

DESCRIPTION OF THE PREFERRED EMBODIMENTS

Referring now to the drawing there are illustrated various embodiments of an article carrier which is adapted for carrying articles or cargo on an exterior body panel of a vehicle.

Figure 1:
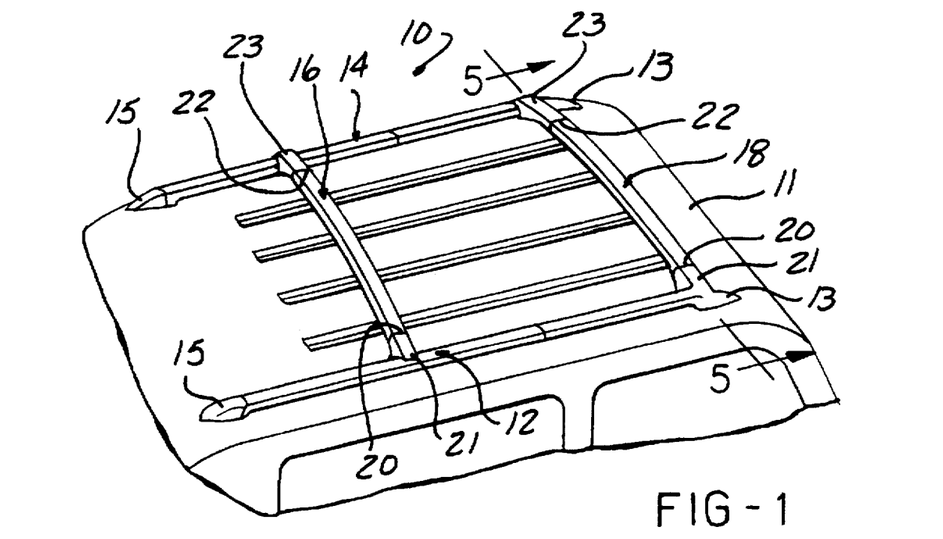
FIG. 1 is a perspective view of an article carrier constructed in accordance with a first embodiment of the present invention.

As shown in FIG. 1. the article carrier 10 is mounted on a substantially horizontally extending vehicle exterior surface panel 11. such as a roof panel, of a vehicle. Alternately, the article carrier 10 could be mounted on a trunk of an automobile. Such panels 11 are substantially horizontal in orientation and generally planar in shape. except that such body panels may have a slight bow from a longitudinal center line to the outer side edges thereof.

In general, the article carrier 10 includes a pair of side rails denoted generally by reference numbers 12 and 14 which are laterally spaced on the exterior body panel 11 and extend longitudinally along the length of the exterior body panel 11. The side rails 12 and 14, which are substantially identical, although typically formed as mirror images of each other, may be formed of any suitable material for carrying articles, such as metal, plastic and combinations thereof. The side rails 12 and 14 are fixed to the vehicle exterior panel 11 by suitable means, such as fasteners, adhesive, etc., not shown. Further, the side rails 12 and 14 may have any suitable shape, with the shape described and illustrated herein being by way of example only. Such shapes may provide aerodynamic qualities as well as serving an aesthetic purpose. In the embodiments shown in FIGS. 1-8, the side rails 12 and 14 have a multi-ribbed cross-section along their longitudinal length.

Figure 2:
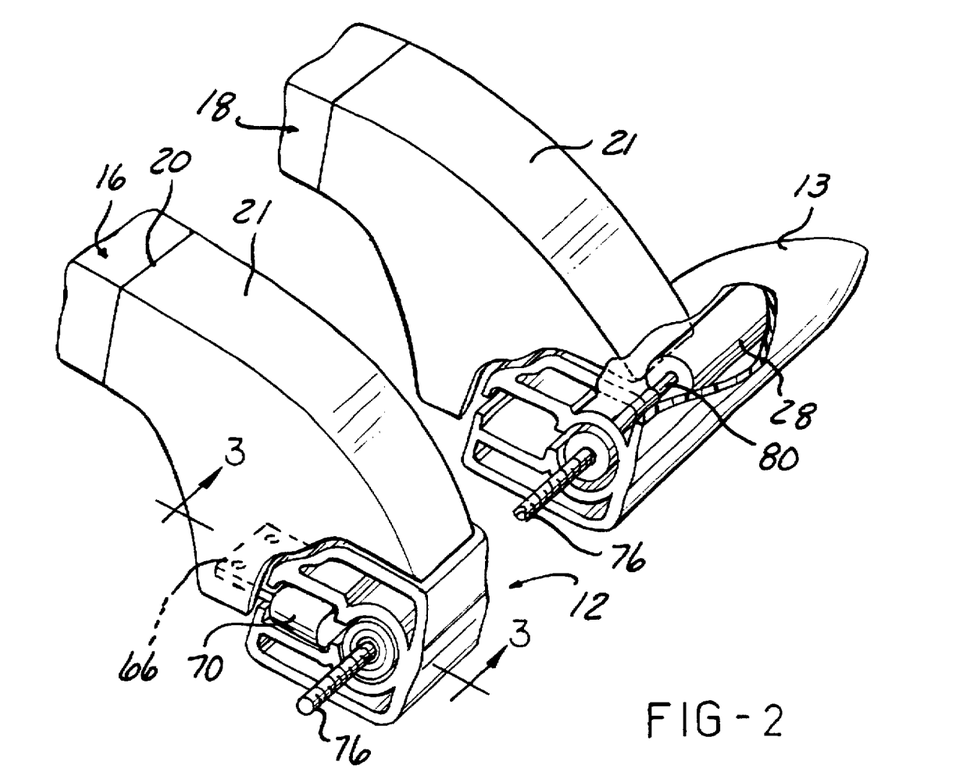
FIG. 2 is an exploded. partial. perspective view showing the means for adjusting the position of the movable cross rail along the side rail of the first embodiment shown in FIG. 1.
Figure 4:
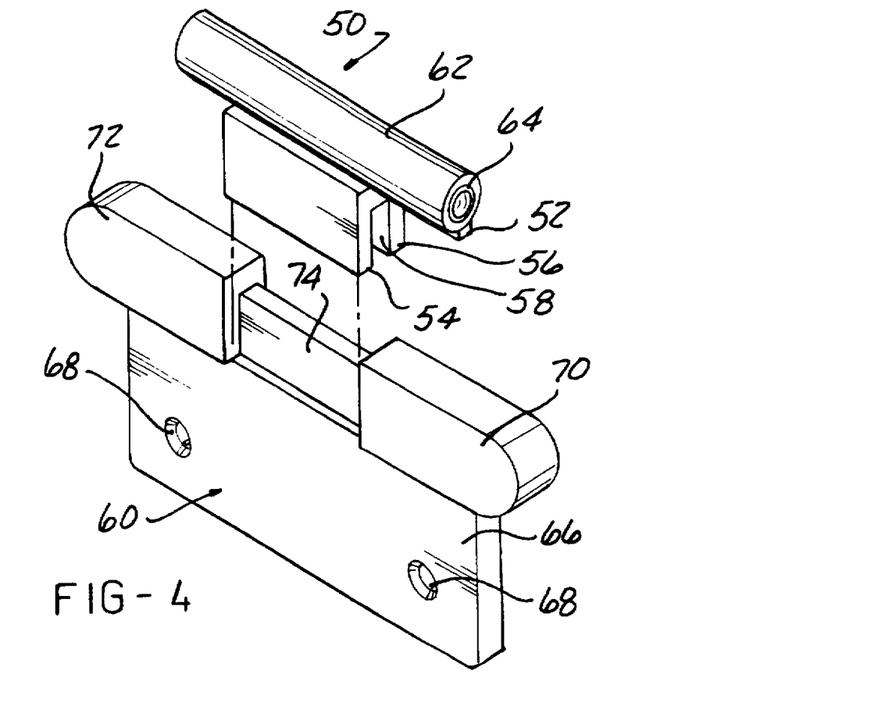
FIG. 4 is an exploded. perspective view of the shuttle cleat shown in FIG. 3.
Figure 5:
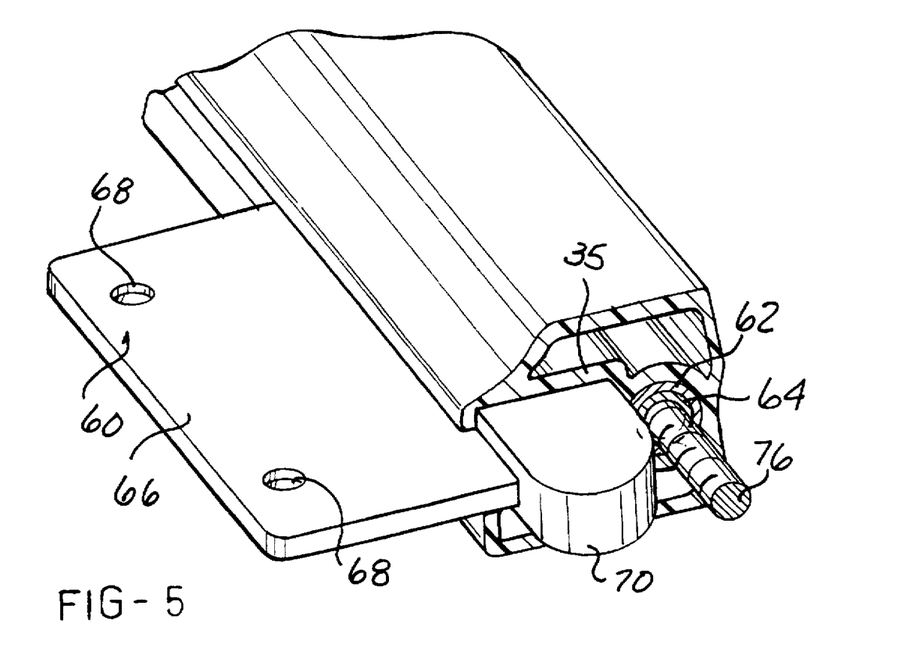
FIG. 5 is a partial. perspective view showing the mounting of the shuttle cleat in one of the side rails.

In a specific embodiment shown in FIGS. 2, 4 and 5, each of the side rails 12 and 14 has a lower surface 30 disposed in registry with the surface of the vehicle exterior body panel 11. The side rails 12 and 14 may have various aerodynamic and aesthetic shapes extended from the lower surface 30. A slot 34 extends longitudinally along the inner side of each side rail 12 and 14. A pair of spaced lateral ribs 35 and 37 extend between the inner and outer sides of each side rail 12 and 14. A slot 39 is formed at one end of the ribs 35 and 37 and opens to a circular cross section bore 41.

End caps 13 and 15 are mounted to opposite ends of each side rail 12 and 14, respectively, to close the ends of the side rails 12 and 14. Each of the side rails 12 and 14, in this exemplary embodiment, is formed of two sections, each integrally formed with one of the end caps 13 and 15. Alternately, the end caps 13 and 15 may be joined to opposite ends of each side rail 12 and 14 by interfitting tongue and groove connections. Suitable fasteners, adhesives, etc., not shown, may also be employed to fixedly interconnect the side rails 12 and 14 to the end caps 13 and 15.

The article carrier 10 includes at least two cross rails 16 and 18, at least one of which is movable longitudinally along the side rails 12 and 14. As shown in the embodiment depicted in FIG. 1, the cross rail 16 is movable longitudinally along the side rails 12 and 14; while the cross rail 18 is stationarily mounted to one end of the side rails 12 and 14.

The cross rails 16 and 18 extend laterally between the side rails 12 and 14 and are formed with any exterior shape, such as, for example, a shape providing aerodynamic and aesthetic qualities. Further, the cross rails 16 and 18 may be formed of any suitable metal, plastic, or combinations thereof, and may be hollow or solid, as desired.

Each of the cross rails, such as cross rail 16, has opposed lateral ends 20 and 22. Separate stanchions 21 and 23 are attached to each end 20 and 22 of the cross rail 16. The stanchions 21 and 23 serve to slidably mount or connect the cross rail 16 to the side rails 12 and 14 as well as to support the cross rail 16 above the vehicle exterior surface 11.

By example, one pair of stanchions 21 and 23 are integrally formed as part of each end cap 13. The stanchions 21 and 23 connected to the movable cross rail 16 are slidably disposed on the side rails 12 and 14, respectively. Alternately, the stanchions 21 and 23 for the fixed cross rail 18 can be separate elements slidably mounted on the side rails 12 and 14 and attached to opposite ends of the cross rail 18.

A shuttle cleat 50, shown in detail in FIGS. 2, 3, 4 and 5, is slidably mounted in each side rail 12 and 14. The shuttle cleat 50 has an elongated base 52 from which a pair of spaced legs 54 and 56 extend. A notch 58 is formed between the spaced legs 54 and 56.

Means are provided on the shuttle cleat 50 for coupling the shuttle cleat 50 to the rotatable drive shaft described hereafter. The coupling means includes a hollow, generally cylindrical, tubular member 62 mounted on or integrally formed with the base 52 of the shuttle cleat 50. An internally threaded metallic insert 64 is preferably fixedly mounted in the cylindrical tubular member 62.

A mounting member 60 is insertable into the notch 58 and has a plate portion 66 with at least a pair of apertures 68. The pair of apertures 68 receive fasteners for attaching the plate portion 66 to the bottom of the stanchion 21 as shown in FIGS. 2 and 3.

As shown in FIGS. 4 and 5, the side ends of the plate portion 66 of the mounting member 60 extend outward beyond the opposite ends of the legs 54 and 56 of the shuttle cleat 50. A pair of pads 70 and 72 are mounted on or integrally formed on the outer ends of the plate portion 66 on opposite sides of a reduced thickness end 74 sized to engage the notch 58. The pads 70 and 72, substantially fill the cavity between the ribs 35 and 37 in the side rail 12 or 14 as shown in FIGS. 3 and 5. The pads 70 and 72 are spaced a short distance from the ends of the legs 54 and 56 on the shuttle cleat 50 to loosely couple one end of the mounting member 60 to the shuttle cleat 50 while providing a small amount of play between the shuttle cleat 50 and the mounting member 60.

As described hereafter, a drive member denoted generally by reference number 76 is in the form of a threaded shaft. The drive member is engaged by the metal insert 64 in the cylindrical tubular member 62 on the shuttle cleat 50.

Figure 3:
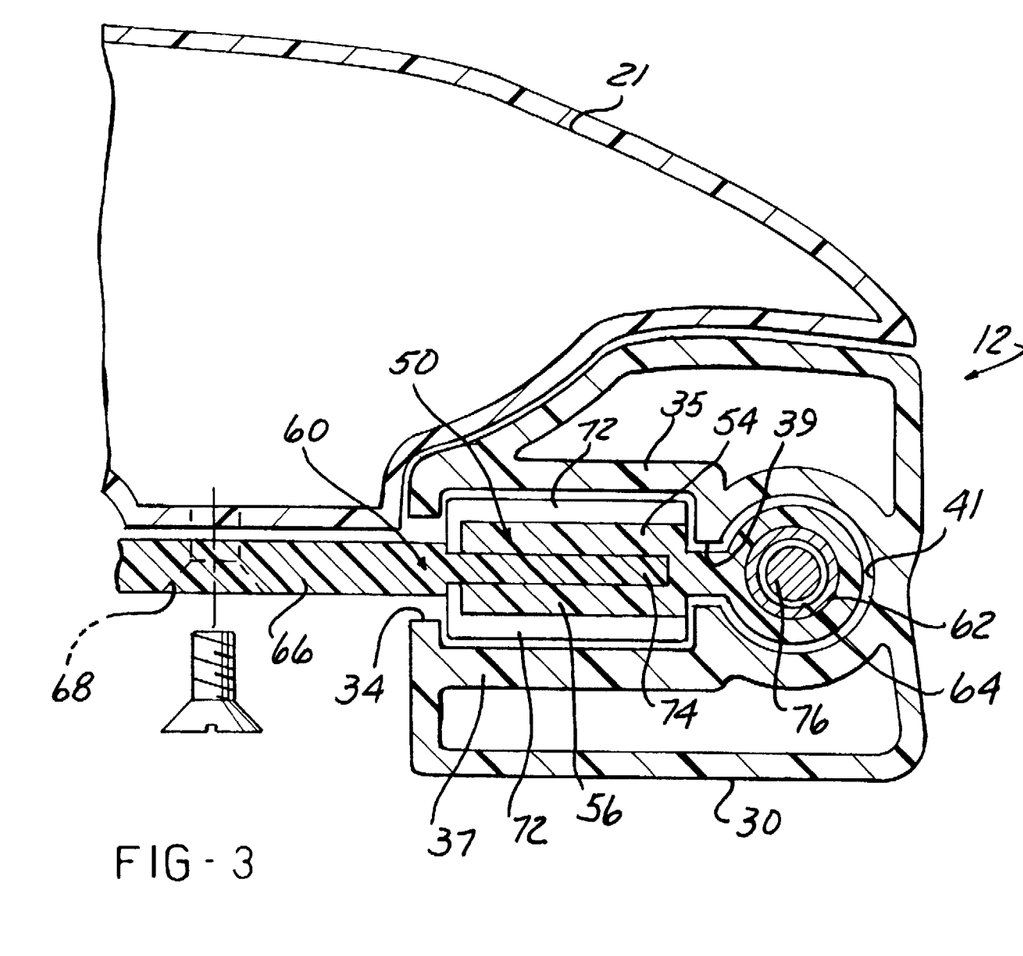
FIG. 3 is a cross sectional view generally taken along line 3—3 in FIG. 2.

Since the mounting member 60 is fixedly connected to the stanchion 21 on the movable cross rail 16 and is coupled to the drive member 64 by the shuttle cleat 50, as shown in FIGS. 2, 3 and 4, bi-directional movement of the drive member 76, as described hereafter, results in bi-directional sliding movement of the shuttle cleat 50 in each side rail 12 and 14 and thereby the movable cross rail 16.

As shown in FIG. 2, the drive means in this embodiment includes two drive motors 78, one of which is stationarily mounted in each end cap 13. Each drive motor 78 has an output shaft 80 which is coupled to the drive member or rotatable shaft 76. In a preferred embodiment, the output shaft of each drive motor 78 is coupled to one end of one drive member or rotatable shaft 76 such that bi-directional rotation of one of the drive motor 78 results in simultaneous bi-directional rotation of the shafts 76. Such bi-directional rotation of the shafts 76 causes longitudinal translation of the cross rail 16 along the side rails 12 and 14.

Any suitable coupler may be employed to couple the output shaft of the motor 78 to the rotatable shaft 76. For example, various gears or gear assemblies may be used, particularly if the motor output shaft is angularly or perpendicularly oriented with respect to the rotatable shaft 76. Preferably, however, the motor output shaft is axially aligned with the axial extent of the rotatable shaft 76. The end of the motor output shaft can be fixedly joined to one end of the rotatable shaft 76 either directly or via a gear transmission.

Figure 7A:
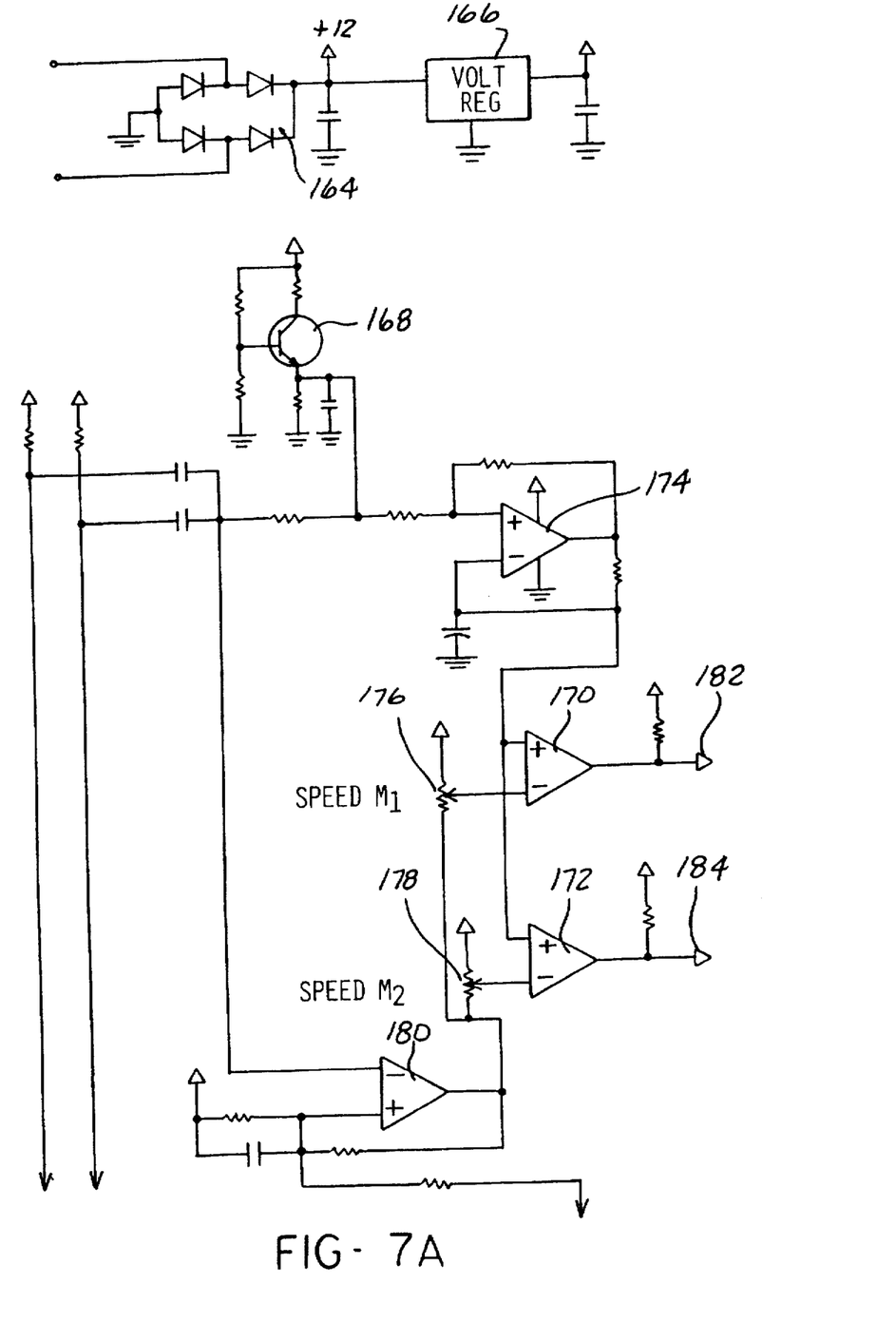
FIGS. 7A and 7B are circuit diagrams of motor control circuitry used with the embodiment shown in FIGS. 1 and 2.
Figure 7B:
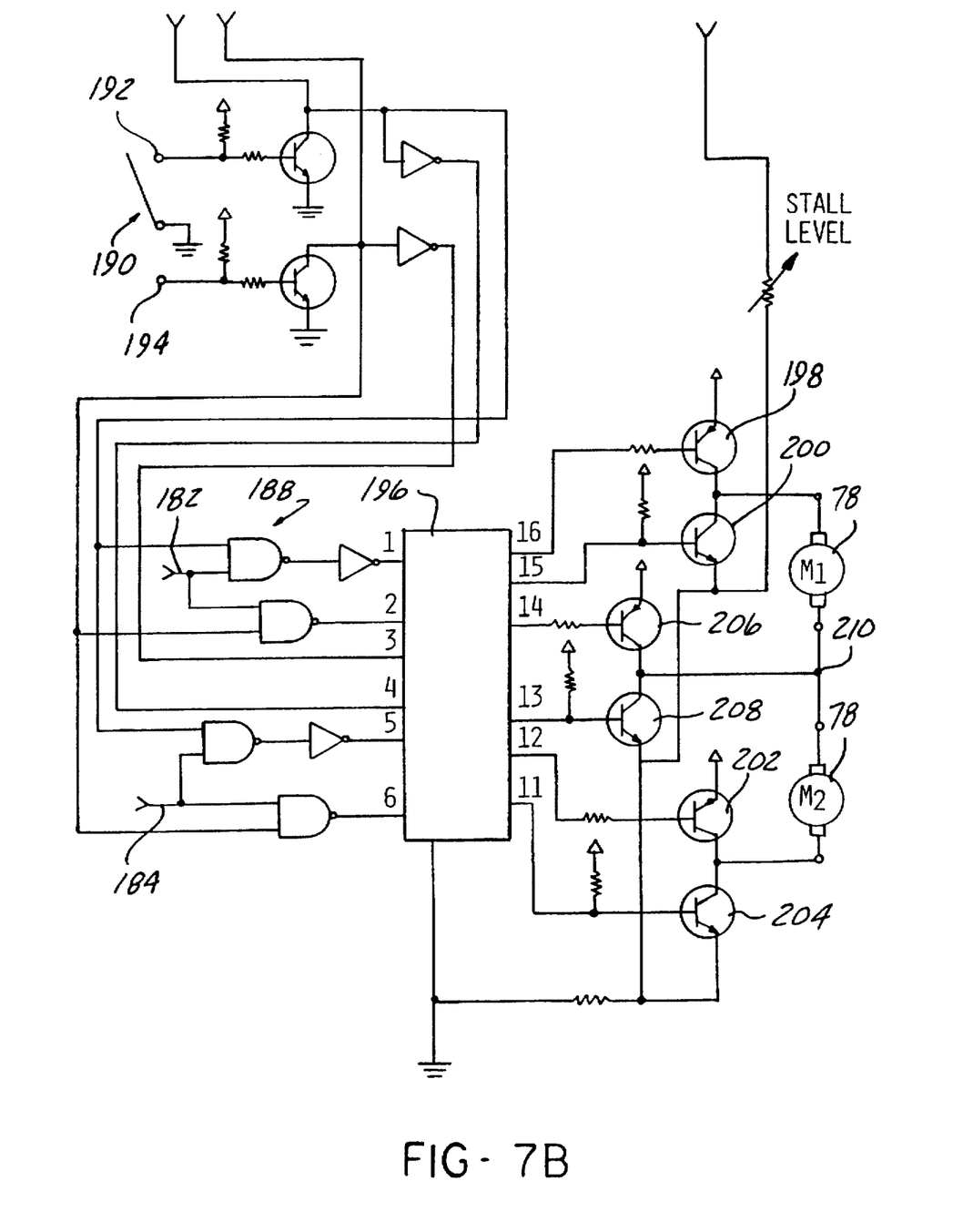

FIGS. 7A and 7B depict a motor control circuit used to operate and synchronize the rotation of the output shafts of the two motors 78. As shown in FIG. 7A, input power from a suitable electric power source, such as a vehicle battery, is supplied to a bridge rectifier 164. The output of the bridge rectifier 164 is input to a voltage regulator 166 which supplies +5 volt power to the motor control circuitry. A biased transistor 168 provides a reference voltage for an operational amplifier 174.

The amplifier 174 is connected with positive feedback to act as an oscillator at 20 KHz which provides a pulse width modulated triangular wave signal to the positive inputs of the comparators 170 and 172. The negative input of the comparators 170 and 172 receives a variable resistance provided by potentiometers 176 and 178, respectively. The variable resistance or potentiometers 176 and 178 provides a selective speed signal for the respective motors 78 which, in a preferred embodiment, is identical or adjusted for motor output variations to provide equal rotation of the output shafts of the motors 78. Power is supplied to the variable resistors 176 and 178 from an integrator 180 which sums the current drawn by the motors 78 over time. When the summed current exceeds a predetermined maximum, which is indicative of a stall condition, one or both of the outputs of the comparators 170 and 172 will go high and provide an output signal on respective output leads 182 and 184 to a logic circuit denoted generally by reference number 188 in FIG. 7B.

As shown in FIG. 7B, an input selector switch 190 is mountable at a suitable location in the vehicle or on the article carrier 10. The switch 190 is, by way of example, a single pole, double throw switch which is selectively connectable to contacts 192 and 194 which correspond to opposite directions of rotation of the output shafts of the motors 78 to move the movable cross rail in either forward or rearward directions along the side rails 12 and 14. The contacts 192 and 194 are connected to various NAND gates in the logic circuit 188 along with the stall signals 182 and 184 from the comparators 170 and 172 to provide inputs to a Darlington array 196, model No. ULN2003. The Darlington array 196 provides selective outputs to a plurality of pairs of transistors arranged in a conventional push-pull amplifier arrangement. Specifically, a first pair of outputs from the Darlington array 196 is input to the bases of transistors 198 and 200 which provide current to the first motor 78. Another pair of outputs from the Darlington array 196 is connected to the bases of transistors 202 and 204 to provide current to the second motor 78. A third pair of outputs from the Darlington array 196 controls transistors 206 and 208 which are connected to a common connection 210 on each of the motors 78.

In this manner, depending upon which contact 192 and 194 is closed or grounded by movement of the switch 190, current is supplied to both motors 78 of an appropriate polarity to cause the output shafts 80 of the motors 78 to rotate in one direction corresponding to the made contact 192 or 194.

If a stall or overcurrent condition is detected by the integrator 180, one or both of the outputs 182 and 184 of the comparators 170 and 172 will go high thereby switching the outputs of the Darlington array 196 off through the logic circuit 188 to deactivate the motors 78. The selector switch 190 must then be turned off and then on again to reenergize the motors 78.

Figure 6:
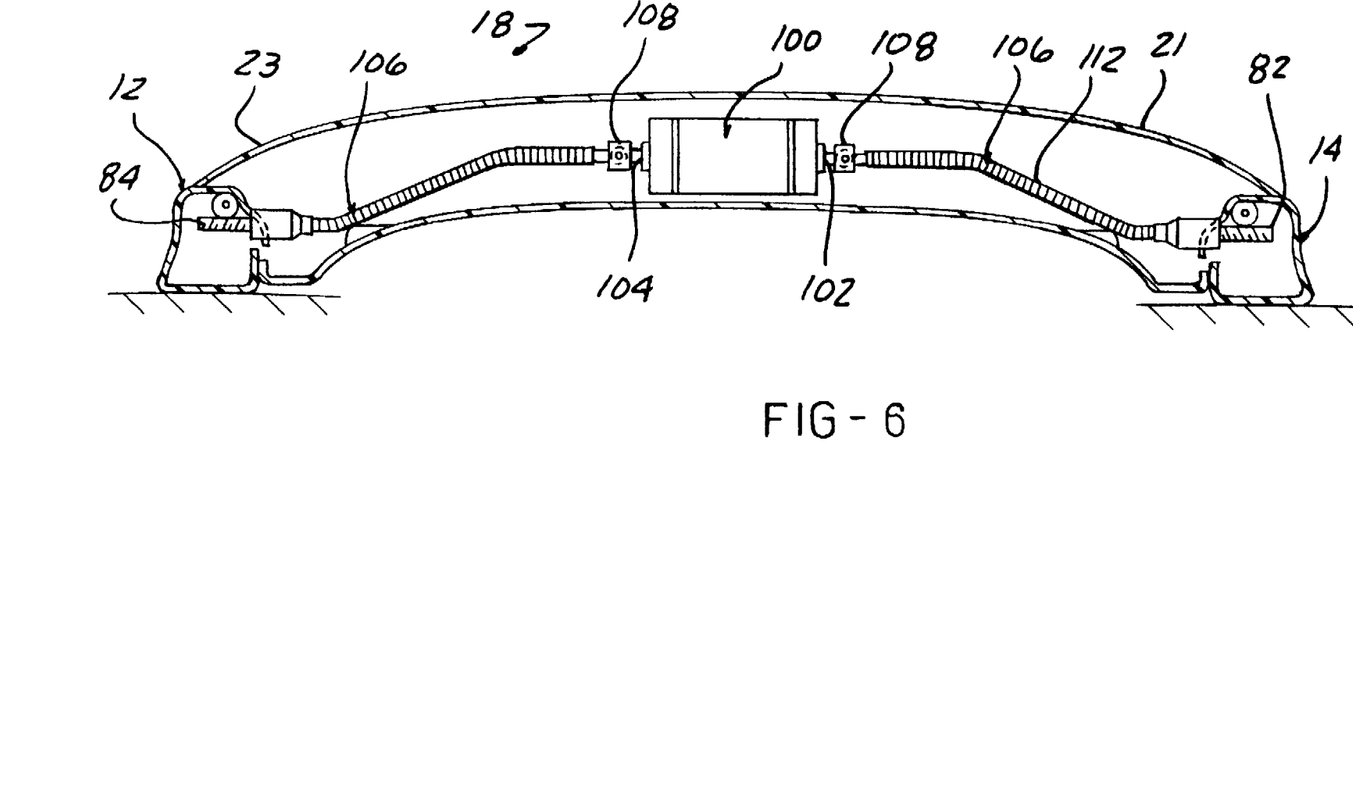
FIG. 6 is a cross sectional view, generally taken along line 5—5 in FIG. 1. and showing the rotating means of a second embodiment mounted in the stationary cross rail shown in FIG. 1.

Referring now to FIG. 6, the drive means of the present invention, in another embodiment, includes a single electric drive motor 100 which is fixedly mounted in the stationary cross rail 18. It will be understood that the single drive motor 100 could also be mounted in other locations; i.e., in one end cap 15, for example, as long as suitable connections are used to couple the motor output shafts to each of the rotatable drive shafts. The drive motor 100 has at least one and preferably a pair of oppositely extending, rotatable output shafts 102 and 104. By way of example, a DCPM gear motor, type D40, manufactured by the Barber-Colman Company, Rockford, Illinois may be employed as the drive motor 100.

Suitable control wires, not shown, extend from the motor 100 to a power source, such as the vehicle battery, as well as to a control switch having two positions, i.e., forward and reverse. The control switch reverses the polarity of electric power supplied to the motor 100 thereby enabling the output shafts 102 and 104 to be co-axially rotated in one of two opposed directions, as desired to reposition the movable cross rail 16 to a desired longitudinal position on the body panel 11 with respect to the stationary cross rail 18.

A flexible, rotatable connector 106 connects the output shaft 102 to a gear 82 in the side rail 12. A similar flexible, rotatable connector 106 also connects the output shaft 104 to a gear 82 in the opposed side rail 14 as shown in FIG. 6. Any flexible connector 106 may be employed which is capable of transmitting rotation of the output shaft 102 or 104 to rotation of the associated gear 82 or 84 despite any offset between the rotational axes of the output shafts of the motor 100 and the gears 82 and 84.

By way of example only, the flexible connector 106 is in the form of a flexible shaft manufactured by SDP, Catalog Nos. A 7Z-11 or A 7C-11. Such a flexible shaft has an end fitting 108 which engages the rotatable output shaft 102 of the motor 100 and is fixed in place by means of a set screw. At the other end of the flexible shaft or connector 106, a fitting having a D or square shape extends into engagement with a correspondingly formed D or square shaped bore in the gear 82 or 84 to interconnect the flexible shaft 106 to the gear 82 or 84 for simultaneous rotation. The flexible connector 106 has an outer housing 112 which surrounds an internally disposed, flexible shaft or cable, not shown, extending between the end fittings.

In operation, when the motor control switch is activated, electric power is supplied to the motor 100 causing the output shafts 102 and 104 to simultaneously rotate in one direction. Such rotation is transmitted by the flexible connectors 106 to the gears 82 and 84 in the side rails 12 and 14. As the gears 82 and 84 engage the drive members or shafts 76, rotation of the gears 82 and 84 results in rotation of both drive members 76. Since each drive member 76 is fixedly secured to one of the shuttle cleats 50, as described above, each shuttle cleat 50 moves with rotation of the drive member 76 thereby resulting in simultaneous driving movement of both ends 20 and 22 of the cross rail 16. Since the gears 82 and 84 and the drive members 76 are moved simultaneously, both ends 20 and 22 of the movable cross rail 16 likewise move in unison thereby maintaining the cross rail 16 substantially perpendicular to the side rails 12 and 14. The control switch to the motor 100 is released when the movable cross rail 16 has reached the desired position with respect to the fixed cross rail 18.

In summary, there has been disclosed a unique article carrier for vehicles which maintains a movable cross rail substantially perpendicular to the side rails during longitudinal repositioning of the movable cross rail. In one embodiment, the article carrier is provided with a unique powered drive means which automatically drives the movable cross rail to a desired longitudinal position with respect to the fixed cross rail when the drive means is activated.

What is claimed is:

1. A vehicle article carrier comprising:
   a pair of spaced side rails mounted on and extending substantially horizontally and longitudinally along a vehicle body surface, an interior cavity extending longitudinally through each side rail;
   a movable cross rail slidably positionable along the side rails;
   a threaded rotatable shaft extending through each side rail;
   motor means, coupled to each shaft for rotating each shaft; and
   means, coupled to each threaded shaft and to the cross rail, for longitudinally adjusting the position of the cross rail along the side rails while maintaining the movable cross rail substantially perpendicular to the side rails upon rotation of each threaded shaft.

2. The vehicle article carrier of claim 1 wherein the position adjusting means comprises:

a shuttle cleat movably mounted in each side rail; and means for coupling the shuttle cleat to the threaded shaft in each side rail for longitudinal movement of the shuttle cleat upon rotation of each threaded shaft.

3. The vehicle article carrier of claim 2 wherein the coupling means comprises:

a tubular member fixedly carried on the shuttle cleat and having an internally threaded bore threadingly engagable with the threaded shaft.

4. The vehicle article carrier of claim 3 wherein the means for threadingly coupling further comprises:

a threaded metallic insert mounted in the tubular member, the threaded metallic insert threadingly engagable with the threaded shaft.

5. The vehicle article carrier of claim 3 further comprising:

each side rail having a first bore slidably receiving the threaded shaft and the tubular member on one shuttle cleat;

each side rail having a second bore communicating with the first bore; and the means for coupling the shuttle cleat to the cross rail being slidably carried in the second bore.

6. The vehicle article carrier of claim 5 further comprising:

a slot having a smaller cross section than the first and second bores connecting the first and second bores; and a base formed on the shuttle cleat slidably extending through the slot.

7. The vehicle article carrier of claim 5 wherein the means for coupling each shuttle cleat to each side rail comprises:

a plate fixed on the cross rail;

a base extending from the tubular member and receiving the plate.

8. The vehicle article carrier of claim 7 wherein:

the base includes two spaced legs defining an opening at a first end therebetween and a closed second end forming a notch to receive the plate.

9. The vehicle article carrier of claim 8 further comprising:

enlarged pads formed on opposite ends of the plate and disposed outside of the legs on the base when the plate is received in the legs to axially connect the plate to the legs.

10. The vehicle article carrier of claim 2 wherein the motor means comprises:

an electric motor having a bi-directional rotatable output shaft; and means for coupling the electric motor output shaft to one of the threaded shafts.

11. The vehicle article carrier of claim 10 wherein the coupling means axially couples the output shaft of the electric motor to the threaded rotatable shaft.

12. The vehicle article carrier of claim 1 wherein the motor means comprises:

first and second electric motors each having a bi-directional rotatable output shaft, the output shaft of one of the first and second electric motors connected to one of the threaded shafts.

13. The vehicle article carrier of claim 12 wherein:

the output shaft of one of the first and second electric motors is axially connected to one of the threaded shafts.

14. The vehicle article carrier of claim 1 wherein the motor means comprises:

an electric motor having a bi-directional rotatable output shaft; and means for coupling the motor output shaft to one of the threaded shafts.

15. The vehicle article carrier of claim 14 wherein the coupling means axially couples the output shaft of the electric motor to the threaded shaft.

16. The vehicle article carrier of claim 1 wherein the rotating means comprises:

first and second electric motors each having a bi-directional rotatable output shaft, the output shaft of each of the first and second electric motors connected to one of the threaded shafts.

17. The vehicle article carrier of claim 16 wherein:

the output shaft of each of the first and second-electric motors is axially connected to one of the rotatable shafts.

18. The vehicle article carrier of claim 1 comprising:

a fixed cross rail stationarily mounted on the pair of side rails;

the motor means including an electric motor mounted in the fixed cross rail, the electric motor has two oppositely extending rotatable output shafts; and connector means, connected at one end to one output shaft oft he motor and coupled at another end to one threaded shaft, for transmitting rotation of the motor output shafts to rotation of the threaded shafts.

19. A vehicle article carrier comprising:

a pair of spaced side rails mounted on and extending substantially horizontally and longitudinally along a vehicle body surface, an interior cavity extending longitudinally through each side rail;

a cross rail movably positionable along the pair of side rails;

a threaded shaft extending through each side rail;

a shuttle cleat movably mounted within each side rail;

means for fixedly coupling the shuttle cleat in each side rail to the cross rail;

means, carried on the shuttle cleat, for threadingly engaging the threaded shaft whereby rotation of the threaded shaft effects linear translation of the shuttle cleat;

motor means for rotating the threaded shafts in each of the side rails to linearly adjust the position of the shuttle cleats and the cross rail along the pair of side rails, the motor means including:

a pair of electric motors each having a bi-directional rotatable output shaft; and means, connecting the output shaft of one electric motor to one threaded shaft, for transmitting rotation of the output shaft of the motor to rotation of the respective threaded shaft.

* * * * *

UNITED STATES PATENT AND TRADEMARK OFFICE
CERTIFICATE OF CORRECTION

PATENT NO. : 5,752,637
DATED : May 19, 1998
INVENTOR(S) : Karl Blankenburg

It is certified that error appears in the above-indentified patent and that said Letters Patent is hereby corrected as shown below:

Column 7, line 60, delete "rotatable".

Signed and Sealed this

Twenty-first Day of July, 1998

Attest:

BRUCE LEHMAN

*Attesting Officer*       *Commissioner of Patents and Trademarks*